(12) United States Patent
Ramamurthy et al.

(10) Patent No.: US 12,705,572 B2
(45) Date of Patent: Aug. 11, 2026

(54) IMAGE-BASED INVENTORY SYSTEM

(71) Applicant: Home Depot Product Authority, LLC, Atlanta, GA (US)

(72) Inventors: Hari Ramamurthy, Marietta, GA (US); Todd Stankiewicz, Acworth, GA (US); Deepak Kumar Arumugam, Smyrna, GA (US); Aroon Narayanan, Atlanta, GA (US); Andrew Fritts, Atlanta, GA (US); Chris Black, Decatur, GA (US); Muzammil Akram, Marietta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 371 days.

(21) Appl. No.: 18/101,742

(22) Filed: Jan. 26, 2023

(65) Prior Publication Data

US 2024/0135317 A1 Apr. 25, 2024

Related U.S. Application Data

(60) Provisional application No. 63/417,876, filed on Oct. 20, 2022.

(51) Int. Cl.

| | |
|---|---|
| ***G06Q 10/087*** | (2023.01) |
| ***G06V 10/98*** | (2022.01) |
| ***G06V 20/52*** | (2022.01) |
| ***H04N 23/66*** | (2023.01) |
| ***H04N 23/90*** | (2023.01) |

(52) U.S. Cl.

CPC ......... *G06Q 10/087* (2013.01); *G06V 10/993* (2022.01); *G06V 20/52* (2022.01); *H04N 23/66* (2023.01); *H04N 23/90* (2023.01)

(58) Field of Classification Search

CPC .... G06Q 10/087; G06V 10/993; G06V 20/52; H04N 23/66; H04N 23/90

See application file for complete search history.

(56) References Cited

U.S. PATENT DOCUMENTS

| | | | |
|---|---|---|---|
| 9,473,747 | B2 | 10/2016 | Kobres et al. |
| 10,789,483 | B1 | 9/2020 | Ren et al. |

(Continued)

FOREIGN PATENT DOCUMENTS

| | | | | |
|---|---|---|---|---|
| CN | 113627418 A | 11/2021 | | |
| IN | 202241007099 A | 2/2022 | | |
| WO | WO-2021262682 A1 * | 12/2021 | .......... | G06Q 10/047 |

OTHER PUBLICATIONS

International Search Report and Written Opinion of international application No. PCT/US2023/071774, dated Nov. 7, 2023, 13 pp.

(Continued)

*Primary Examiner* — A. Hunter Wilder

(74) *Attorney, Agent, or Firm* — Greenberg Traurig, LLP

(57) ABSTRACT

A system for image-based inventory determination including a cart. The cart includes a camera and a cart computing system in communication with the camera. The cart computing system includes a cart processor and a cart memory storing instructions that, when executed by the cart processor, cause the cart computing system to capture and store a set of images from the camera; process the set of images to identify an image of the set of images that displays a section of shelving having both a left vertical beam and a right vertical beam; and transmit the identified image to a remote server.

20 Claims, 4 Drawing Sheets

(56) References Cited

U.S. PATENT DOCUMENTS

| | | | | |
|---|---|---|---|---|
| 11,295,163 | B1 | 4/2022 | Schoner et al. | |
| 2015/0046299 | A1 | 2/2015 | Yan | |
| 2015/0363758 | A1* | 12/2015 | Wu | G06T 7/74 705/20 |
| 2017/0337508 | A1* | 11/2017 | Bogolea | G06Q 10/087 |
| 2017/0339336 | A1 | 11/2017 | Daliyot | |
| 2017/0357939 | A1 | 12/2017 | Jones et al. | |
| 2018/0025412 | A1 | 1/2018 | Chaubard et al. | |
| 2018/0107999 | A1 | 4/2018 | Rizzolo et al. | |
| 2018/0108134 | A1 | 4/2018 | Venable | |
| 2018/0260772 | A1 | 9/2018 | Chaubard et al. | |
| 2020/0013007 | A1 | 1/2020 | Bogolea | |
| 2020/0242544 | A1* | 7/2020 | Galluzzo | B25J 9/1692 |
| 2020/0294234 | A1* | 9/2020 | Rance | G06T 7/0012 |
| 2021/0216954 | A1 | 7/2021 | Chaubard | |
| 2021/0312414 | A1 | 10/2021 | Jones et al. | |
| 2022/0067436 | A1 | 3/2022 | Larson et al. | |

OTHER PUBLICATIONS

Jiang et al. "Deep-Learning-Based Vuggy Facies Identification from Borehole Images", SPE Res Eval & Eng 24 (01): 250-261, vol. 24, Issue 01, Feb. 2021. Retrieved onOct. 12, 2023. Retrieved from <URL: https://onepetro.org/REE/article-abstract/24/01/250/449978/Deep-Leaming-Based-Vuggy-Facies-Identification?redirected From=fulltext> entire document, 13 pp.

Radacsi et al. "A Path Planning Model for Stock Inventory Using a Drone", Mathematics, Aug. 12, 2022. Retrieved on Oct. 9, 2023. Retrieved from <URL: https://www.mdpi.com/2227-7390/10/16/2899/htm> entire document, 19 pp.

Saqlain et al. "Hybrid Approach for Shelf Monitoring and Planogram Compliance (Hyb-SMPC) in Retails Using Deep Learning and Computer Vision", Research Article I Open Access Volume, Jun. 15, 2022. Retrieved on Oct. 9, 2023. Retrieved from <URL: https://www .hindawi.com/journals/mpe/2022/4916818/> entire document, 18 pp.

Paolanti, Marina, et al., Mobile robot for retail surveying and inventory using visual and textual analysis of monocular pictures based on deep learning, Located via IEEExplore, 3 pgs.

Yilmazer, Ramiz, et al., Shelf Auditing Based on Image Classification Using Semi-Supervised Deep Learning to Increase On-Shelf Availability in Grocery Stores, Sensors 2021, Located via Google Scholar, 26 pgs.

Rahul Moorthy, et al., Applying Image Processing for Detecting On-Shelf Availability and Product Positioning in Retail Stores, Located via Google Scholar, pp. 451-457.

Vargheese, Rajesh, et al., An IoT/IoE enabled architecture framework for precision on shelf availability: Enhancing proactive shopper experience, Located via IEEExplore, 3 pgs.

Rupanaguid, Sudhir Rao, et al., A novel video processing based cost effective smart trolley system for supermarkets using FPGA, Located via IEEExplore, 2 pgs.

M. Marder, et al., Using image analytics to monitor retail store shelves, Located via Google Scholar 2 pgs.

* cited by examiner

IMAGE-BASED INVENTORY SYSTEM

CROSS-REFERENCE TO RELATED APPLICATIONS

This application is a non-provisional conversion of U.S. Pat. App. 63/417,876 titled "IMAGE-BASED INVENTORY SYSTEM," filed Oct. 20, 2022, the contents of which are incorporated herein in its entirety and for all purposes.

TECHNICAL FIELD

The present disclosure generally relates to inventory determination in a facility based on images captured in the facility, including apparatus for image capture and image processing techniques for determining inventory quantities based on captured images.

DETAILED DESCRIPTION

Current inventory systems do not enable location-specific inventory knowledge in most facilities. Accordingly, known inventory systems may be improved upon through image-based determination of inventory quantities and locations of items in a facility, such as a warehouse, store, etc. Those known inventory systems that do use imaging to track inventory still require human input to filter through images and identify those of an appropriate quality for review. These known inventory systems also require a human to indicate which images display an entire shelf, as the known inventory systems do not analyze inventory on a shelf-by-shelf basis. As such, there is a need to improve the automated detection and tracking of inventory within a facility, and to do so without incurring further labor from required manual scanning while moving inventory.

Figure 1:
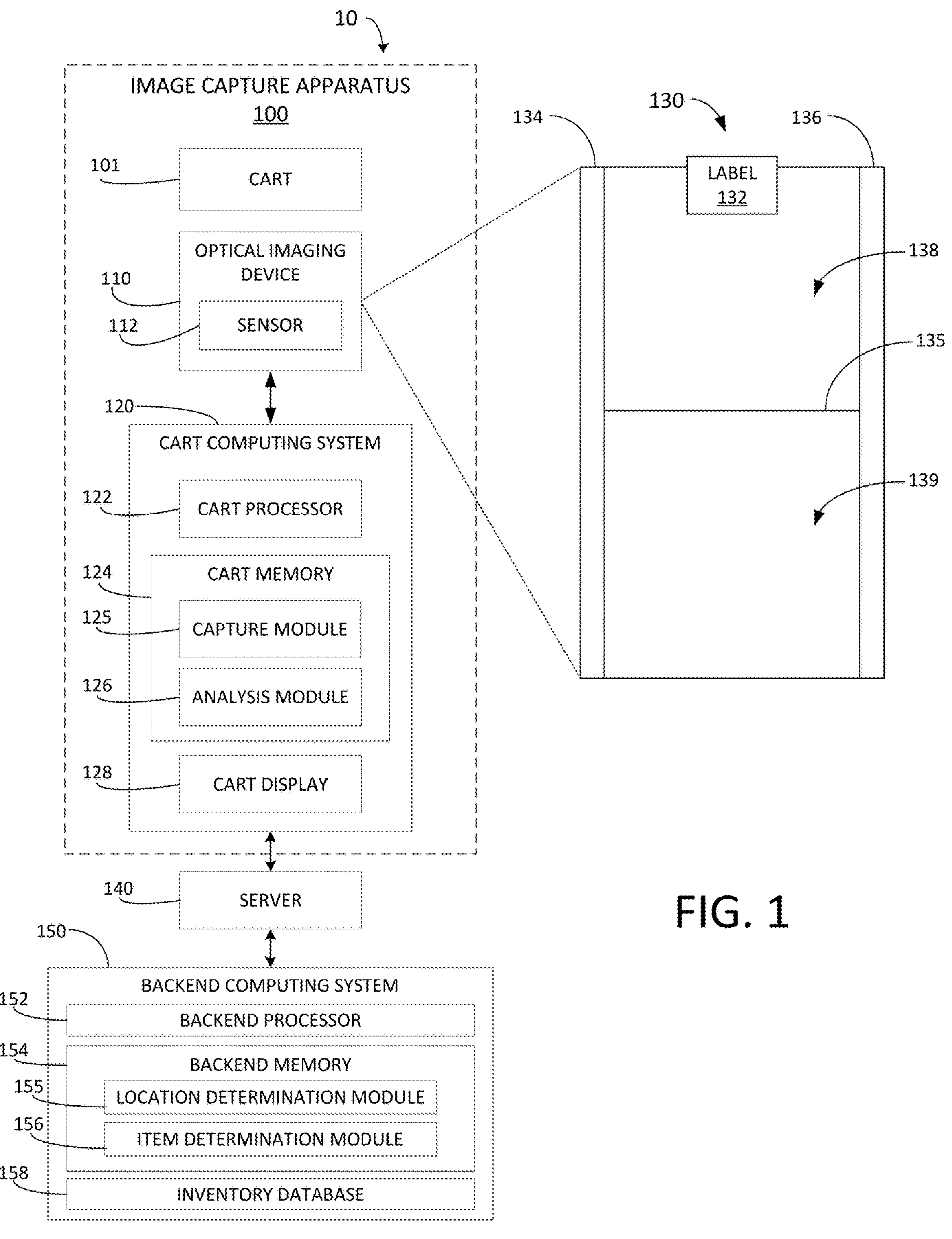
FIG. 1 is a block diagram illustrating an example system for determining item inventory in a facility.

Referring now to the drawings, wherein like numerals refer to the same or similar features in the various views, FIG. 1 is a diagrammatic view of an example system 10 for image-based inventory management. As shown, the system 10 may include an image capture apparatus 100, a bay 130, a server 140, and a backend computing system 150. The image capture apparatus 100 may be in communication with the backend computing system 150 via the server 140.

The image capture apparatus 100 may include a cart 101 an optical imaging device 110, and a cart computing system 120. The cart 101 may be any movable structure or vehicle capable of supporting the optical imaging device 110 and the cart computing system 120. The cart 101 may be a trolley or wagon specifically configured as part of the image capture apparatus 100, in some embodiments. The cart 101 and related components are described in greater depth below with regard to FIG. 2.

The optical imaging device 110 may be a camera or similar device configured to capture an image. For example, the optical imaging device 110 may have an aperture that allows light into a sealed chamber. The sealed chamber has a light-sensitive surface that receives the light and allows for the light to be translated or transposed as an image. In some embodiments, the optical imaging device 110 may be configured to capture still images, such that the images captured and reviewed by the image capture apparatus are discrete pictures. In some embodiments, the optical imaging device 110 may be configured to capture moving images (e.g., movies, videos, etc.), such that the images captured and reviewed by the image capture apparatus 100 may be videos and/or frames from videos. In some embodiments, the optical imaging device 110 may be configured for both still images and moving images.

The optical imaging device 110 may include multiple optical imaging devices, with each individual optical imaging device configured to capture its own images. In some embodiments, the multiple optical imaging devices may be directed to different portions of shelving by being positioned at different heights and pointed at different angles. The different optical imaging devices may be in communication with each other, and may coordinate image capturing. For example, the multiple optical imaging devices may, when each receives a capture command, pass the command through to the other optical imaging devices such that multiple (e.g., all) optical imaging devices take substantially simultaneous images. Additionally or alternatively, the cart computing system 120 may coordinate image capture by multiple optical imaging devices 110 through transmission of coordinated commands, for example. In another example, only one of the multiple optical imaging devices may receive location data from the cart computing system 120, and that multiple optical imaging device may communicate the received location data to the other multiple optical imaging devices to coordinate the capture of images based on location.

The optical imaging device 110 may include a sensor 112 configured to provide data to the cart computing system 120 respective of one or more characteristics of the image capture apparatus 100 and, more specifically, of the optical imaging device 110. The sensor 112 may include a velocity sensor configured to determine a speed of the image capture apparatus 100, a LIDAR sensor configured to determine a distance of the image capture apparatus 100 (or, specifically the optical imaging device 110) from a nearby object (e.g., bay 130), a Radio Frequency Identification (RFID) sensor or similar sensor to scan RFID tags or other identification tags placed on bays, placed on items stored on shelves of bays, etc. For example, such tags may be encoded with the location of a bay (where the tag is on the bay, not the item), with an identifier of a product (where the tag is on the item, not the bay), or other information that may be used to correlate a captured image with a location or a subject of the image.

The cart computing system 120 may include a cart processor 122 and a non-transitory, computer-readable cart memory 124 storing instructions that, when executed by the cart processor 122, cause the cart computing system 120 to perform one or more image capturing, processing, etc. tasks of this disclosure. The instructions in the cart memory 124 may include a capture module 125 that may issue commands to the optical imaging device 110 to take one or more images (e.g., still photos, video, etc.) of the bay 130. The instructions in the cart memory 124 may further include an analysis module 126 that may review images from the capture module 125 to determine those images that may be relevant and/or may have a level of quality.

The capture module 125 may issue commands to the optical imaging device 110 in order to capture one or more images. The capture module 125 may issue the capture commands at regularly-spaced intervals (e.g., capture an image every second, every 3 seconds, etc.), and may issue the capture commands based on one or more characteristics of the image capture apparatus 100. For example, the capture module 125 may determine that the image capture apparatus 100 is traveling above a threshold speed (e.g., from sensor 112) or is a above a threshold distance away from the target to be imaged (e.g., from a LIDAR sensor 112) and may decline to issue capture commands until the optical imaging device 110 returns to traveling at or below the threshold speed and at or within the threshold distance, at which time the capture module 125 resumes issuing capture commands at regular intervals. In some embodiments, the capture module 125 receives input from a user (e.g., via the cart display), and issues capture commands to the optical imaging device 110 in response to the received input. Each captured image may be associated or labelled with a timestamp.

The analysis module 126 may receive captured images (or frames) from the optical imaging device 110, and may determine a relative quality of each captured image. In response to determining that a captured image is of adequate quality, the analysis module 126 may transmit the captured image(s) to the backend computing system 150. In response to determining that a captured image is not of adequate quality, the analysis module 126 may delete the captured image. Adequate quality may refer to relevancy of the objects in the image (e.g., the image shows a bay 130 for analysis); completeness of the image (e.g., all desired elements present in the image), clarity of objects in the image, brightness of the image, comparison to a quality metric, etc. In some embodiments, the analysis module 126 may utilize a blind image quality assessment (BIQA) model that uses machine learning and a large-scale set of training data to evaluate the quality of the captured images against a quality metric without using a standard reference image. In some embodiments, the analysis module 126 may measure the focus (or sharpness) of the captured images (e.g., by evaluating the presence of defined edges using gradients or Laplacian transforms), and the analysis module may determine an image having greater focus or sharpness to be of adequate quality.

In some embodiments, the analysis module 126 may provide real-time feedback to a user (e.g., via the cart display 128) based on the assessed quality. For example, if the analysis module 126 determines that the focus on a certain number of successive images (e.g., five or more) is below a threshold, the analysis module 126 may display a notification instructing the user to slow down.

The analysis module 126 may determine the presence of relevant objects in and/or the completeness of a captured image (or frame) by processing the image to identity each object in the image, comparing the identified objects to a list of required objects, and determining that each required object is present in the image. For example, the analysis module 126 may determine that a single image includes a complete desired structure, such as a complete bay. As shown in FIG. 1, an example bay 130 may include a first vertical bar 134, a second vertical bar 136, a dividing shelf 135, an upper portion 138, a lower portion 139, and a label 132. Although the bay 130 is shown with a single dividing shelf 135, the methods and systems described herein should not be limited to only those bays with a single shelf, and should be read to apply to bays of all shapes and quantities. In some embodiments, the list of required objects may include the label 132, the first vertical bar 134, and the second vertical bar 136, such that the analysis module 126 determines that a captured image is complete in response to determining that the captured image includes a label 132, a first vertical bar 134, and a second vertical bar 136. In some embodiments, the list of required objects may include any other characteristic and/or component of the bay 130. For example, the list of required objects may include an empty upper portion 138, such that the analysis module 126 may determine that an image is complete (and therefore ready to be transmitted to the backend computing system 150) in response to the analysis module 126 determining that the image of the bay 130 in question includes an empty upper portion (e.g., out-of-stock).

The analysis module 126 may process each captured image (or frame) for object-identification by applying a machine learning algorithm (e.g., a convolutional neural network) that may be trained using a data set comprising images of bays or shelving similar to the example bay 130. The analysis module 126 may perform object identification in two stages, in some embodiments. In a first stage, the analysis module 126 may perform an object localization task to establish bounding boxes around each object in the captured image, and, in a second stage, the analysis module 126 may perform an object detection to assign a class or label to each object bounded in the first stage. Once each object is classified, the analysis module 126 may generate a list of each classified object, which may then be compared to the list of required objects, as described above.

The training process for each stage may involve an evaluation of performance of the analysis module 126 against expected results for each training image. For example, the analysis module 126 may first be trained on single-object localization, in which the analysis module 126 receives a training image as input and is then trained based on a distance between the bounding box determined by the analysis module 126 and an expected bounding box associated with the training image. This process may be repeated for a pre-determined number of iterations (e.g., training images), or until the analysis module 126 is sufficiently accurate (e.g., the mean distance between the determined and expected bounding boxes is within a threshold value). In some embodiments, the analysis module 126 may be trained in multiple-object localization, which is a similar process but involves training images having multiple objects, and evaluating analysis module 126 performance based on the determined bounding boxes for all objects compared to the expected bounding boxes, as well as whether the analysis module 126 identifies and sets bounding boxes for all objects (e.g., does not miss an object). In some embodiments, the multiple-object localization training may replace the single-object localization training as the initial round of training.

Training the analysis module 126 for object detection may be similar to the process for training the analysis module 126 for object localization, in that the analysis module 126 may receive a training image and may be evaluated based on performance relative to expected performance associated with the training image. Performance may be evaluated based on precision and recall of the determined classifications relative to the expected classifications, with higher precision assigned to those determined classifications that are identical to the expected classifications, or that are in the same category or genus as the expected classifications. In some embodiments, the training image(s) input to the analysis module 126 for training at this stage may include pre-defined bounding boxes, such that the analysis module 126 is only classifying the bounding boxes and is trained only on classifying the objects in the bounding boxes. In other embodiments, the training image(s) input to the analysis module 126 do not include pre-determined bounding boxes, such that the analysis module 126 is evaluated and trained on both stages (e.g., object localization and object detection).

Once the analysis module 126 has identified the required objects in the image (e.g., two vertical bars), the analysis module 126 may determine that the image includes a bay 130, and may locate, identify, and review a label 132 on the bay 130. This label 132 may identify the bay 130 or one or more objects stored by the bay 130. The analysis module 126 may be configured to determine contents of the label 132 (e.g., text, bar code, serial number, etc.) and determine a location of the bay 130 based on the contents of the label 132. This may be performed locally, such that the cart computing system 120 has a database or similar repository of bay 130 locations to which the analysis module 126 compares the label contents, or remotely, such that the analysis module 126 transmits the label 132 contents to a remote computing system that determines the bay 130 location and transmits the location back to the analysis module 126. The analysis module 126 may then associate the location of the bay 130 with the image before transmitting the image to the backend computing system 150.

The cart computing system 120 may include a cart display 128 that may be configured to provide a Graphical User Interface (GUI) that can present information regarding the cart computing system 120 and, in particular, the capture module 125 and the analysis module 126. In turn, the cart display 128 may receive input from a user (e.g., through touchscreen functionality of the display 128), which may be translated and transmitted to and throughout the cart computing system. In embodiments, additional or alternative user input devices may be provided with the cart computing system 120 for receiving input from the user.

The system 10 may further include a server 140 in electronic communication with the image capture apparatus 100 and the backend computing system 150. The server 140 may provide a website, data for an application, or other interface through which the user of the image capture apparatus 100 may control the image capture apparatus 100 and send (and receive) data from the backend computing system 150. For example, the application provided on the image capture apparatus 100 may enable a user to command the optical imaging device 110 to capture an image, to review the image or to review results on the analysis module 126 (e.g., on the interface), and to transmit the image to the backend computing system 150 (e.g., in embodiments in which the cart computing system 120 does not automatically transmit reviewed images).

The backend computing system 150 may include a backend processor 152 and a non-transitory, computer-readable backend memory 154 storing instructions that, when executed by the backend processor 152, cause the backend computing system 150 to perform one or more image processing tasks of this disclosure. The instructions in the backend memory 154 may include a location determination module 155 that analyzes images to determine a physical location depicted in each image (e.g., one or more shelves, bays, endcaps, floor areas, etc.). The instructions in the backend memory 154 may further include an item determination module 156 that may determine the identity and/or quantity of one or more items depicted in each image. The backend computing system 150 may, based on associated identified locations and items determined by the modules 155, 156, transmit the locations and/or quantities in the facility of one or more items to an inventory database 158. The inventory database 158 may serve as ground truth for the locations in the facility of such items, such as to guide individuals in the facility to the proper location in the facility for an item, and/or to accurately report quantities of items in the facility.

In some embodiments, the backend computing system 150 or some of its functionality may be, or may be included in, the cart computing system 120. Additionally or alternatively, the backend computing system 150 or some of its functionality may be, or may be included in, a cloud-based computing service. Additionally or alternatively, the backend computing system 150 or some of its functionality may be, or may be included in, a computing device that is separate from the cart computing system 120.

Figure 2:
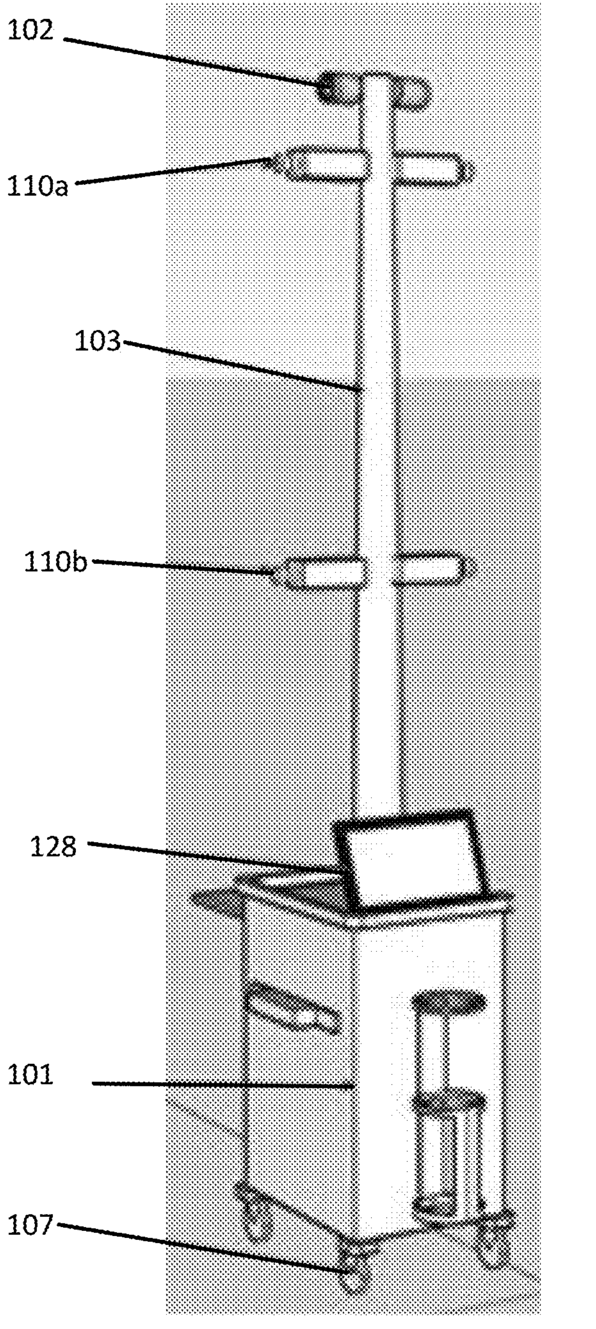
FIG. 2 is a perspective view of an example image capture apparatus that may find use in the system of FIG. 1.
Figure 2:
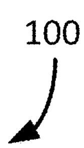

FIG. 2 is a perspective view of an example image capture apparatus 100. As shown, the example image capture apparatus 100 includes the cart 101, a light 102, a mount pole 103, a first optical imaging device 110*a*, a second optical imaging device 110*b*, the cart display 128, and wheels 107. Although this example image capture apparatus 100 is shown, the systems and methods described herein should not be limited to this specific arrangement of components and this specific example apparatus 100. The image capture apparatus 100 may include any functional components required to operate one or more components of the cart, such as a battery or other power source.

The cart 101 may be any suitable structure or vehicle that is capable of bearing a load (e.g., the cart computing system 120, etc.) and being propelled by a user. This propulsion may be enabled by wheels 107, which are positioned on a relative bottom of the cart 101. Although the wheels 107 are shown as wheels, the wheels 107 could be any mechanism or component configured to enable movement of the cart 101. For example, the wheels 107 may be a smooth surface that enables movement by reducing an amount of frictional resistance between the cart 101 and the floor, or the wheels 107 may be treads or similar mechanism. In some embodiments, the apparatus 100 may further include a motor structured to provide power to the wheels 107, such that the apparatus 100 may be self-propelled. In some embodiments, no power is provided to the wheels 107, such that the apparatus 100 may be propelled by force applied by a user. The cart 101 may include a housing that contains the cart computing system 120, in some embodiments.

As shown, the apparatus 100 of FIG. 2 includes two optical imaging devices 110: the first optical imaging device 110*a* at a relatively higher height (e.g., above 8 feet), and the second optical imaging device 110*b* at a relative lower height (e.g., below 8 feet). Although two optical imaging devices 110 are shown, more or fewer optical imaging devices 110 may be included. The first and second optical imaging devices 110*a-b* may be the same optical imaging device, such that the first and second optical imaging devices 110*a-b* may have substantially identical image-capturing capabilities. The apparatus 100 positions the first and second optical imaging devices 110*a-b* at different heights in order to capture images of entire bays without sacrificing quality, as having a single optical imaging device 110 attempting to capture an image that includes a relatively tall bay 130 (e.g., greater than 10 feet) could result in a distorted or unclear image.

The first and second imaging devices 110 may have different physical components or different settings from each other to enable capture of specific types of images, in some embodiments. For example, the first and second imaging devices 110 may have different lenses or different physical or digital zoom settings to enable capture images of different widths or different heights. Further, the first and second imaging devices 110 may be attached to the apparatus 100 at different angles relative to the ground (e.g., to capture images of bays, items, etc. at different heights) and/or at different angles relative to vertical (e.g., looking "forward", "backward", or sideways from the apparatus 100) to capture images of bays, items, etc. angled perpendicular to the direction of movement of the apparatus 100 and/or parallel to the direction of movement.

The first and second optical imaging devices 110*a*-*b* may be positioned at different heights via the mount pole 103, which may be coupled to the cart 101 at a lower end and may include the light 102 at an upper end. The light 102 may be any suitable lighting element, and may receive commands from the cart computing system 120. In some embodiments, the light 102 may be in communication with the optical imaging device(s) 110, such that the light 102 may engage or provide light in coordination with the optical imaging device(s) 110 capturing images. The first and second optical imaging devices 110*a*-*b* may be positioned at fixed places along the mount pole 103, or the first and second optical imaging devices 110*a*-*b* may be movable or positionable along the mount pole 103. For example, if another optical imaging device 110 is added to the mount pole 103, the positions of the first and second optical imaging devices 110*a*-*b* may be adjusted to accommodate the new optical imaging device 110. As shown, the first and second optical imaging devices 110*a*-*b* may be oriented on opposite sides of the mount pole 103, such that the first and second optical imaging devices 110*a*-*b* are both configured to capture images on both sides of the apparatus 100 simultaneously.

Referring to FIGS. 1 and 2, in operation, a user (e.g., an associate of the entity operating the facility) may push the apparatus 100 through a facility, such as a warehouse, retail store, etc. The user may initiate image capture through an interface presented on the display 128. Once initiated, the image cart computing system 120 may coordinate image capture by the image devices 110, such as through coordinated commands to capture substantially simultaneous images. Alternatively, the image devices 110 may capture sequences pf images (e.g., videos) at predetermined frame rates, such as frame rates set by the user through the cart computing system 120. In some embodiments, the cart computing system may trigger image capture or set capture frame rates according to a movement speed of the cart. The user may push or otherwise move the cart through a plurality of aisles or other spaces of the facility. In some embodiments, the image devices 100 may be positioned to capture images on both sides of the apparatus 100 simultaneously. In some embodiments, the image devices 100 may be positioned to capture images on one side of the apparatus 100.

As images are captured and the apparatus 100 is moved through the facility, the cart computing system 120 may analyze each image, attempting to identify at least one complete image for each desired shelving section (e.g., bay) or other item storage structure of sufficient quality to identify objects in the image. The cart computing system may perform image analyses described herein for such identification. If a complete image of sufficient quality cannot be identified for a given item storage structure, the cart computing system 120 may output an alert to the user to return to the item storage structure for further image capture with the apparatus 100. Similarly, the user may receive alerts or feedback when a complete image of sufficient quality is identified, or other feedback indicative of proper use of the apparatus and proper image capture.

The cart computing system 120 and/or the backend computing system 150 may analyze captured images to identify items, their quantities, and locations, for updating inventory information. By moving the apparatus 100 throughout an entire facility and capturing images throughout the facility, inventory information respective of the facility may be updated on a regular basis. For example, the apparatus 100 may be used to update inventory information on an hourly or daily basis. As a result, the apparatus and methods described herein offer a significant improvement over known inventory updating methods, which generally rely either on manual image capture, manual observation, and/or other more time-intensive and less reliable tasks and approaches.

In some embodiments, the cart computing system 120 may execute an image identification process to identify a complete image of sufficient quality for each item storage structure in order to streamline the processing load of object identification. For example, the cart computing system 120 may identify a single respective image, for each bay or other item storage structure, and that respective image may be further analyzed to determine the inventory stored on that item storage structure. As a result, the cart computing system 120 may analyze images only for quality and completeness during the movement of the apparatus 100, enabling rapid image capture in the facility. In addition, where inventory analysis is to be performed by the backend computing system 150, the cart computing system 120 may select a single image per item storage structure for transmission to the backend computing system 150, significantly reducing data transmission loads and times relative to transmitting all images or all videos.

Figure 3:
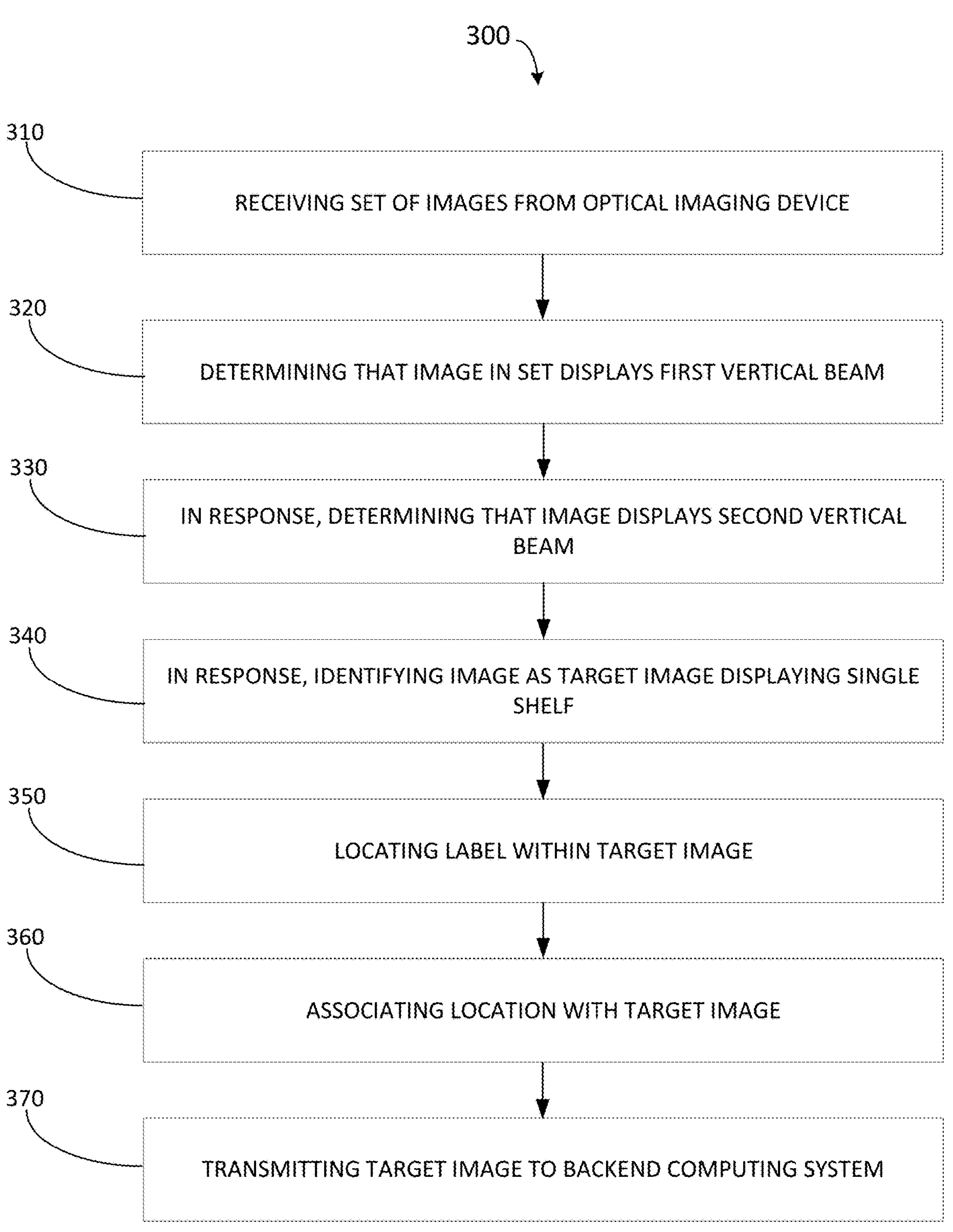
FIG. 3 is a flow chart illustrating an example method for image-based inventory determination.

FIG. 3 is a flow chart illustrating an example method 300 for image-based inventory determination. The method 300, or one or more portions of the method 300, may be performed by the cart computing system 120, and more particularly by the capture module 125 and the analysis module 126, in some embodiments.

The method 300 may include, at block 310, receiving a set of images from an optical imaging device (e.g., the optical imaging device 110). The set of images may be captured in response to one or more commands from the cart computing system 120, and may include images captured by one or more optical imaging devices. In an embodiment in which multiple optical imaging devices are capturing images, the set of images may include images that are taken simultaneously and associated with each other based on a timestamp associated with each image. These images may be associated with each other, such that they share labeling or storage location, or may be stitched or combined together, such that a single combined image is generated based on the one or more simultaneous images. In some embodiments, data from one or more sensors (e.g., sensor 112) may be received in conjunction with the set of images. For example, data from a LIDAR sensor or other depth sensor, which data are associated via timestamp or otherwise via time of capture with the received images, may be received and may be indicative of a distance between an image capture device and a bay or other structure that is the subject of the images. In another example, data from an RFID or BLE sensor, which data are indicative of the location of a bay, location or identify of an item in a bay, or other information encoded in a scanned tag or transponder, may be received.

The method 300 may include, at block 320, determining that an image of the set of images displays a first vertical beam. This block 320 may be performed by the analysis module 126 that, as described above, may locate one or more objects in an image using object localization and may classify those one or more object using object detection. As such, the analysis module 126 may locate and bound each object in the image, and may classify each object.

The method 300 may include, at block 330, determining, in response to the determination at block 320, that the image displays a second vertical beam. In particular, if the analysis module 126 classifies a first located object as a vertical bar, the analysis module 126 may classify it as a first vertical bar and may then attempt to classify a second object as a second vertical bar. In some embodiments, blocks 320 and 330 are performed sequentially, such that objects may be classified one at a time. In these embodiments, for example, if a first vertical bar is not detected, the analysis module 126 may not continue to look for a second vertical bar and may discard the image at-issue. In other embodiments, blocks 320 and 330 are performed substantially simultaneously, such that the analysis module 126 first classifies every located object, and checks the list of objects for first and second vertical bars.

The method 300 may include, at block 340, identifying, in response to the determination at block 330, the image as a target image displaying a single shelf or bay. In some embodiments, block 340 may also include determining that there are no additional vertical bars in the target image, as more than two vertical bars would indicate that the target image does not include a single shelf or bay.

The method 300 may include, at block 350, locating a label within the target image, and, at block 360, associating a location with the target image based on the label. As described above with reference to the analysis module 126, the label (e.g., label 132) may be located and classified by the analysis module 126, and the contents of the label may be extracted and processed (e.g., locally or remotely) to determine a location or contents of the shelf or bay associated with the label 132. From there, the determined location may be associated with the target image (e.g., in the metadata of the target image). The label may be a human-readable label such as alphanumeric text, in some embodiments, and/or a computer-readable label, such as a bar code or QR code, in some embodiments.

The method 300 may include, at block 370, transmitting the target image to a backend computing system (e.g., the backend computing system 150). The location of the target image (e.g., from block 360) may be included in this transmission. The transmission of the target image may be performed automatically in response to the determination of a location (e.g., once the analysis module 126 knows where the image was taken, the analysis module 126 sends the image), or may be performed in response to a command from a user (e.g., via the display 128). The target image may be transmitted to the exclusion of other images, or other partial images, of the same bay. As a result, image transmission may be more efficient than if all images were transmitted.

In some embodiments, block 370 may include transmitting data associated with the target image(s). For example, distance data, scanned tag data, and/or other data received at block 310 and associated with the target image(s) may be transmitted. Such data may be used to process the target images to identify objects, such as items on shelves, to associate a given image with a given location, and/or for another useful purpose.

The method 300, or some or all portions of method 300, may be performed while the apparatus 100 is moved throughout the facility. For example, the cart computing device 120 may perform blocks 310, 320, 330, 340, 350, and 360 continuously to identify a single image respective of each of a plurality of bays in a facility as the apparatus is moved among those bays. Block 370 may similarly be performed on a continuous basis, whereby target images are transmitted as they are collected and processed. Additionally or alternatively, target images may be batched and transmitted periodically (e.g., after a user concludes an image collection session in the facility). For example, target images may be transmitted in response to a user providing an input to transmit the images, as noted above.

Figure 4:
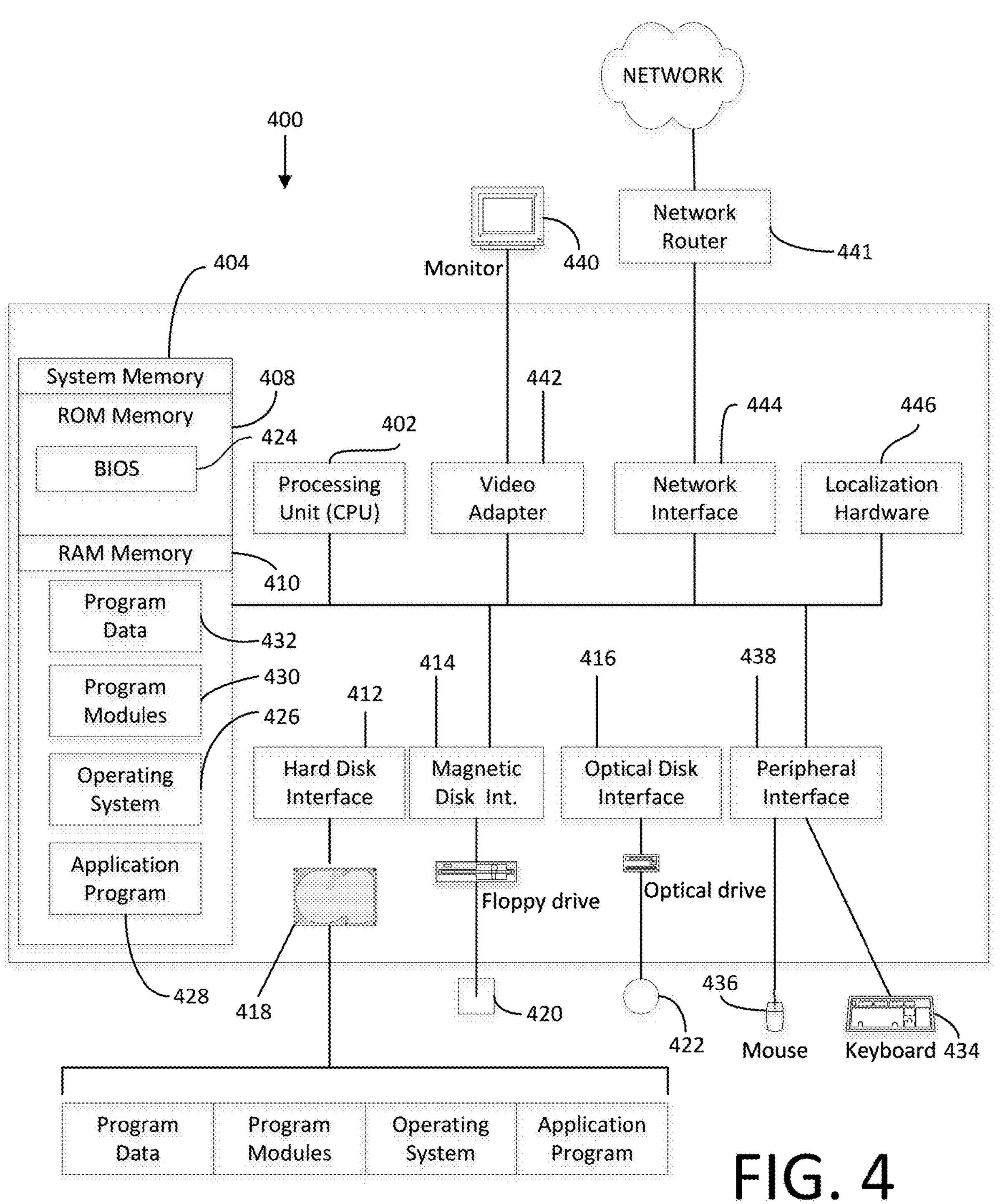
FIG. 4 is a diagrammatic view of an example embodiment of a user computing environment.

FIG. 4 is a diagrammatic view of an example embodiment of a user computing environment that includes a computing system environment 400, such as a desktop computer, laptop, smartphone, tablet, or any other such device having the ability to execute instructions, such as those stored within a non-transient, computer-readable medium. Furthermore, while described and illustrated in the context of a single computing system, those skilled in the art will also appreciate that the various tasks described hereinafter may be practiced in a distributed environment having multiple computing systems linked via a local or wide-area network in which the executable instructions may be associated with and/or executed by one or more of multiple computing systems.

In its most basic configuration, computing system environment 400 typically includes at least one processing unit 402 and at least one memory 404, which may be linked via a bus. Depending on the exact configuration and type of computing system environment, memory 404 may be volatile (such as RAM 410), non-volatile (such as ROM 408, flash memory, etc.) or some combination of the two. Computing system environment 400 may have additional features and/or functionality. For example, computing system environment 400 may also include additional storage (removable and/or non-removable) including, but not limited to, magnetic or optical disks, tape drives and/or flash drives. Such additional memory devices may be made accessible to the computing system environment 400 by means of, for example, a hard disk drive interface 412, a magnetic disk drive interface 414, and/or an optical disk drive interface 416. As will be understood, these devices, which would be linked to the system bus, respectively, allow for reading from and writing to a hard disk 418, reading from or writing to a removable magnetic disk 420, and/or for reading from or writing to a removable optical disk 422, such as a CD/DVD ROM or other optical media. The drive interfaces and their associated computer-readable media allow for the nonvolatile storage of computer readable instructions, data structures, program modules and other data for the computing system environment 400. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 400.

A number of program modules may be stored in one or more of the memory/media devices. For example, a basic input/output system (BIOS) 424, containing the basic routines that help to transfer information between elements within the computing system environment 400, such as during start-up, may be stored in ROM 408. Similarly, RAM 410, hard disk 418, and/or peripheral memory devices may be used to store computer executable instructions comprising an operating system 426, one or more applications programs 428 (which may include the functionality of the cart computing system 120 of FIG. 1 or one or more of its functional modules 125, 126, for example), other program modules 430, and/or program data 432. Still further, computer-executable instructions may be downloaded to the computing environment 400 as needed, for example, via a network connection.

An end-user may enter commands and information into the computing system environment 400 through input devices such as a keyboard 434 and/or a pointing device 436. While not illustrated, other input devices may include a microphone, a joystick, a game pad, a scanner, etc. These and other input devices would typically be connected to the processing unit 402 by means of a peripheral interface 438 which, in turn, would be coupled to bus. Input devices may be directly or indirectly connected to processor 402 via interfaces such as, for example, a parallel port, game port, firewire, or a universal serial bus (USB). To view information from the computing system environment 400, a monitor 440 or other type of display device may also be connected to bus via an interface, such as via video adapter 442. In addition to the monitor 440, the computing system environment 400 may also include other peripheral output devices, not shown, such as speakers and printers.

The computing system environment 400 may also utilize logical connections to one or more computing system environments. Communications between the computing system environment 400 and the remote computing system environment may be exchanged via a further processing device, such a network router 441, that is responsible for network routing. Communications with the network router 441 may be performed via a network interface component 444. Thus, within such a networked environment, e.g., the Internet, World Wide Web, LAN, or other like type of wired or wireless network, it will be appreciated that program modules depicted relative to the computing system environment 400, or portions thereof, may be stored in the memory storage device(s) of the computing system environment 400.

The computing system environment 400 may also include localization hardware 446 for determining a location of the computing system environment 400. In embodiments, the localization hardware 446 may include, for example only, a GPS antenna, an RFID chip or reader, a WiFi antenna, or other computing hardware that may be used to capture or transmit signals that may be used to determine the location of the computing system environment 400.

The computing environment 400, or portions thereof, may include one or more components of the system 10 of FIG. 1, in embodiments.

In some embodiments of the present disclosure, a system for image-based inventory determination includes a cart that includes a camera and a cart computing system in communication with the camera. The cart computing system includes a cart processor, and a cart memory storing instructions that, when executed by the cart processor, cause the cart computing system to capture and store a set of images from the camera, process the set of images to identify an image of the set of images that displays a section of shelving having both a left vertical beam and a right vertical beam, and transmit the identified image to a remote server.

In some of these embodiments, the camera includes a first camera and a second camera, and the set of images includes a set of first images from the first camera and a set of second images from the second camera.

In some of these embodiments, the cart further includes a pole configured to position the first camera at a first height and the second camera at a second height, the first height being greater than the second height.

In some of these embodiments, the identified image is from the set of first images, and further includes a timestamp, and wherein the memory stores further instructions that, when executed by the processor, cause the computing system to identify an associated image from the set of second images sharing the timestamp, and transmit both the identified image and the associated image to the remote server.

In some of these embodiments, the cart computing system further includes a display in communication with the cart computing system, the cart computing system providing a graphical user interface (GUI) on the display configured to receive a user input and to issue a command to the camera in response to the user input.

In some of these embodiments, the cart memory stores further instructions that, when executed by the cart processor, cause the cart computing system to validate the set of images by comparing a characteristic of each of the set of images to a threshold quality metric, and in response to the characteristic violating the threshold quality metric, deleting the respective image from the set of images.

In some of these embodiments, validating the set of images further includes inputting each of the set of images into a machine learning model trained to determine a relative quality of each.

In some of these embodiments, the camera includes a video camera, the set of images includes a video clip, and the identified image includes a single frame of the video clip.

In other embodiments of the present disclosure, a method for image-based inventory determination includes receiving a set of images from an optical imaging device, the set of images displaying a series of shelves, determining that an image of the set of images displays a first vertical beam, in response to determining that the image displays the first vertical beam, determining that the image displays a second vertical beam, in response to determining that the image displays both the first vertical beam and the second vertical beam, identifying the image as a target image displaying a single shelf, locating a label within the target image, the label identifying a location of the single shelf, associating the location with the target image, and transmitting the target image to a backend computing system.

In some of these embodiments, the optical imaging device includes a video camera, the set of images includes a video clip, and the target image includes a single frame of the video clip.

In some of these embodiments, the optical imaging device includes a first optical imaging device and a second optical imaging device, and the set of images includes a set of first images from the first optical imaging device and a set of second images from the second optical imaging device.

In some of these embodiments, the target image is from the set of first images, and further includes a timestamp, and the method further includes identifying a second image from the set of second images sharing the timestamp, associating the second image with the target image, and transmitting both the target image and the second image to the remote server.

In some of these embodiments, the method further includes determining one or more visual elements shared by the target image and the second image, combining the target image and the second image by overlapping the shared one or more visual elements, and transmitting the combined image to the remote server.

In some of these embodiments, the target image includes a first target image, the single shelf includes a first single shelf, and the label includes a first label, and the method further includes identifying a second target image from the set of images, the second target image displaying a second single shelf, locating a second label within the second target image, the second label identifying a location of the second single shelf, comparing the location of the first single shelf to the location of the second single shelf, and in response to the location of the second single shelf being different than the location of the first single shelf, transmitting the second target image to the remote server.

In some of these embodiments, the target image includes a first target image, the single shelf includes a first single shelf, and the first target image includes a first timestamp, and the method further includes identifying a second target image having a second timestamp from the set of images, the second target image displaying a second single shelf, determining an amount of time between the first timestamp and the second timestamp, and in response to the amount of time exceeding a threshold value, transmitting the second target image to the remote server.

In some of these embodiments, the optical imaging device is mounted on a cart.

In further embodiments of the present disclosure, a system for image-based inventory determination includes a cart having an optical imaging device, and a computing system including a processor, and a memory storing instructions that, when executed by the processor, cause the computing system to receive a video feed from the optical imaging device, the video feed displaying a series of shelving, identify a target frame from the video feed displays two vertical shelf beams, and transmit the identified frame to a remote server.

In some of these embodiments, identifying the target frame includes determining that a single frame of the video feed displays a first vertical beam, in response to determining that the single frame displays the first vertical beam, determining that the single frame displays a second vertical beam, and in response to determining that the image displays both the first vertical beam and the second vertical beam, identifying the single frame as the target frame displaying a single shelf.

In some of these embodiments, the memory further stores instructions that, when executed by the processor, cause the computing system to locate a label within the target frame, the label identifying a location of a single shelf defined by the two vertical shelf beams, and associating the location with the target image.

In some of these embodiments, the target frame includes a first target frame, the single shelf includes a first single shelf, and the label includes a first label, and wherein the memory further stores instructions that, when executed by the processor, cause the computing system to identify a second target frame from the video feed, the second target frame displaying a second single shelf, locating a second label within the second target frame, the second label identifying a location of the second single shelf, comparing the location of the first single shelf to the location of the second single shelf, and in response to the location of the second single shelf being different than the location of the first single shelf, transmitting the second target frame to the remote server.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed:

1. A system for image-based inventory determination, the system comprising:

a cart comprising:

a camera; and a cart computing system in communication with the camera, the cart computing system comprising:

a cart processor; and a cart memory storing instructions that, when executed by the cart processor, cause the cart computing system to:

capture and store a set of images from the camera;

validate the set of images by:

inputting each image of the set of images into a machine learning model trained to determine a quality of each image;

comparing, for each image of the set of images, a respective quality of the image to a threshold quality metric; and in response to the respective quality violating the threshold quality metric, deleting the respective image from the set of images;

process the set of images to identify an image of the set of images that displays a section of shelving having both a left vertical beam and a right vertical beam and no additional vertical beams beyond the left vertical beam and the right vertical beam;

locate a label within the identified image, the label identifying a location of the section of shelving;

modify metadata of the identified image to include the location of the section of shelving; and transmit the identified image to a remote server.

2. The system of claim 1, wherein:

the camera comprises a first camera and a second camera, and the set of images comprises a set of first images from the first camera and a set of second images from the second camera.

3. The system of claim 2, wherein the cart further comprises a pole configured to position the first camera at a first height and the second camera at a second height, the first height being greater than the second height.

4. The system of claim 2, wherein the identified image is from the set of first images, and further comprises a timestamp, and wherein the memory stores further instructions that, when executed by the processor, cause the computing system to:

identify an associated image from the set of second images sharing the timestamp; and transmit both the identified image and the associated image to the remote server.

5. The system of claim 1, wherein the cart computing system further comprises a display in communication with the cart computing system, the cart computing system providing a graphical user interface (GUI) on the display configured to receive a user input and to issue a command to the camera in response to the user input.

6. The system of claim 1, wherein the quality comprises a focus of each of the set of images, and wherein comparing the respective quality of an image to the threshold quality metric comprises evaluating a presence of defined edges in the image.

7. The system of claim 1, wherein the machine learning model comprises a blind image quality assessment model that evaluates the quality of each of the set of images without a standard reference image.

8. The system of claim 1, wherein:

the camera comprises a video camera;

the set of images comprises a video clip; and the identified image comprises a single frame of the video clip.

9. A computer-implemented method for image-based inventory determination, the method comprising:

receiving, by a computing system, an image of a set of images from an optical imaging device, the set of images displaying a series of shelves, the image including a quality metric satisfying a threshold quality metric, wherein the quality metric is determined by a blind image quality assessment model based on the image without using a standard reference image;

determining, by the computing system, that the image of the set of images displays a first vertical beam;

in response to determining that the image displays the first vertical beam, determining, by the computing system, that the image displays a second vertical beam;

in response to determining that the image displays both the first vertical beam and the second vertical beam and that the image does not display any additional vertical beams, identifying, by the computing system, the image as a target image displaying a single shelf;

locating, by the computing system, a label within the target image, the label identifying a location of the single shelf;

modifying, by the computing system, metadata of the target image to include the location of the single shelf; and transmitting, by the computing system, the target image to a backend computing system.

10. The method of claim 9, wherein:

the optical imaging device comprises a video camera;

the set of images comprises a video clip; and the target image comprises a single frame of the video clip.

11. The method of claim 9, wherein:

the optical imaging device comprises a first optical imaging device and a second optical imaging device, and the set of images comprises a set of first images from the first optical imaging device and a set of second images from the second optical imaging device.

12. The method of claim 11, wherein the target image is from the set of first images and further comprises a timestamp, and wherein the method further comprises:

identifying a second image from the set of second images sharing the timestamp;

associating the second image with the target image; and transmitting both the target image and the second image to the backend computing system.

13. The method of claim 12, further comprising:

determining one or more visual elements shared by the target image and the second image;

combining the target image and the second image by overlapping the shared one or more visual elements; and transmitting the combined image to the backend computing system.

14. The method of claim 9, wherein the target image comprises a first target image, the single shelf comprises a first single shelf, and the label comprises a first label, and wherein the method further comprises:

identifying a second target image from the set of images, the second target image displaying a second single shelf;

locating a second label within the second target image, the second label identifying a location of the second single shelf;

comparing the location of the first single shelf to the location of the second single shelf; and in response to the location of the second single shelf being different than the location of the first single shelf, transmitting the second target image to the backend computing system.

15. The method of claim 9, wherein the target image comprises a first target image, the single shelf comprises a first single shelf, and the first target image comprises a first timestamp, and wherein the method further comprises:

identifying a second target image having a second timestamp from the set of images, the second target image displaying a second single shelf;

determining an amount of time between the first timestamp and the second timestamp; and in response to the amount of time exceeding a threshold value, transmitting the second target image to the backend computing system.

16. The method of claim 9, wherein the optical imaging device is mounted on a cart.

17. A system for image-based inventory determination, the system comprising:

a cart comprising an optical imaging device; and a computing system comprising:

a processor; and a memory storing instructions that, when executed by the processor, cause the computing system to:

receive a video feed from the optical imaging device, the video feed displaying a series of shelving;

identify a target frame from the video feed that displays two vertical shelf beams and does not display any additional vertical shelf beams, wherein the target frame includes a quality metric satisfying a threshold quality metric;

locate a label within the target frame, the label identifying a location of the series of shelving;

modify metadata of the target frame to include the location of the series of shelving; and transmit the target frame to a remote server.

18. The system of claim 17, wherein identifying the target frame comprises:

determining that a single frame of the video feed displays a first vertical beam;

in response to determining that the single frame displays the first vertical beam, determining that the single frame displays a second vertical beam; and in response to determining that the image displays both the first vertical beam and the second vertical beam, identifying the single frame as the target frame displaying a single shelf.

19. The system of claim 17, wherein the memory further stores instructions that, when executed by the processor, cause the computing system to:

locate a label within the target frame, the label identifying a location of a single shelf defined by the two vertical shelf beams; and associating the location with the target image.

20. The system of claim 19, wherein the target frame comprises a first target frame, the single shelf comprises a first single shelf, and the label comprises a first label, and wherein the memory further stores instructions that, when executed by the processor, cause the computing system to:

identify a second target frame from the video feed, the second target frame displaying a second single shelf;

locating a second label within the second target frame, the second label identifying a location of the second single shelf;

comparing the location of the first single shelf to the location of the second single shelf; and in response to the location of the second single shelf being different than the location of the first single shelf, transmitting the second target frame to the remote server.

* * * * *